INVENTOR
Gordon Francis Wellington Powell
BY
Watson, Cole, Grindle & Watson
ATTORNEY Aug. 29, 1961  G. F. W. POWELL  2,998,525
BALANCING UNIT FOR USE WITH RADIATION GAUGES
Filed July 22, 1958  2 Sheets-Sheet 2

INVENTOR
Gordon Francis Wellington Powell
BY
Watson, Cole, Grindle & Watson
ATTORNEY

2,998,525
BALANCING UNIT FOR USE WITH RADIATION GAUGES
Gordon Francis Wellington Powell, Deptford, London, England, assignor to Molins Machine Company Limited, London, England, a British company
Filed July 22, 1958, Ser. No. 750,162
Claims priority, application Great Britain July 30, 1957
1 Claim. (Cl. 250—105)

This invention concerns an improved balancing unit for use with a radiation gauge. It is well-known in radiation gauge apparatus used for measuring the mass of a moving quantity of material, for example, a moving tobacco filler in a cigarette machine, to provide a balancing unit similar to the measuring gauge but having an absorber between its radio-active source and ray-responsive device which absorber is equivalent in absorbing properties to the desired mass of the moving material. The currents from the ray-responsive devices of the two gauges oppose one another and any difference shows a departure from the normal mass of the material being measured.

It is often desirable to have such a balancing unit adjustable over a range and the present invention provides a unit easily adjustable by very small amounts over a range.

According to the invention there is provided a balancing unit for use with a radiation gauge, said unit comprising a radioactive source and a ray responsive device with an absorber therebetween, said absorber comprising a pair of rotatable metal discs having eccentric rims which move in proximity with one another so as jointly to provide absorbing metal in the ray path and means for rotating the discs so as to vary the proportion of metal and air in the ray path and thus vary the absorption value of the unit.

The invention also comprises an absorber as recited in the preceding paragraph.

A fixed absorber may also be provided to absorb a large part of the emission.

The invention further comprises an absorber for a balancing unit comprising a rotatable member adapted to cover to any desired extent a radio-active source, the extent being varied by rotation of the member.

Figure 1:
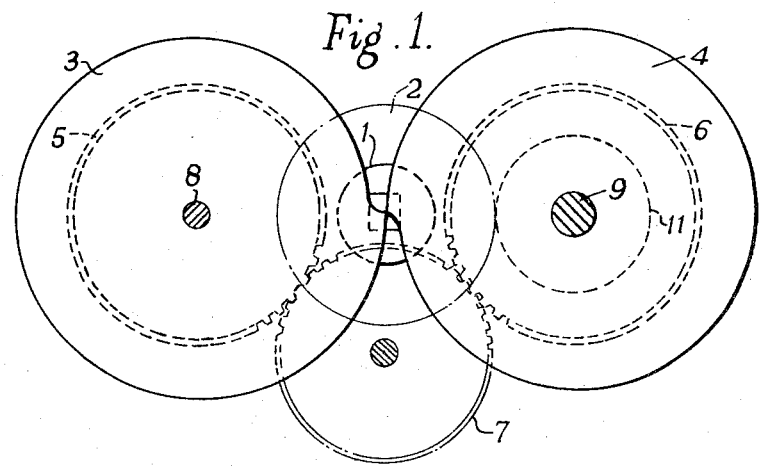
Figure 2:
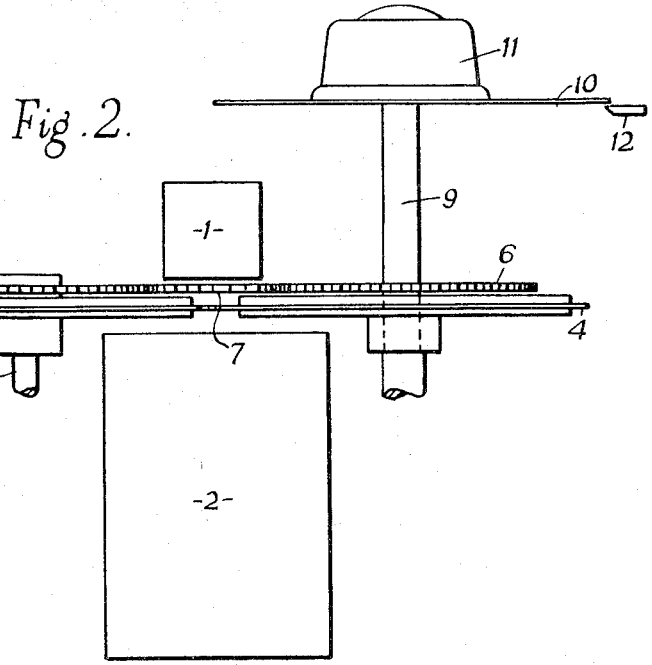
Figure 3:
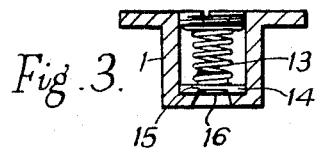
Figure 4:
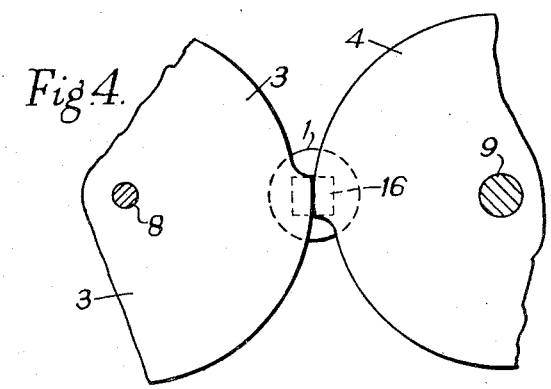
Figure 5:
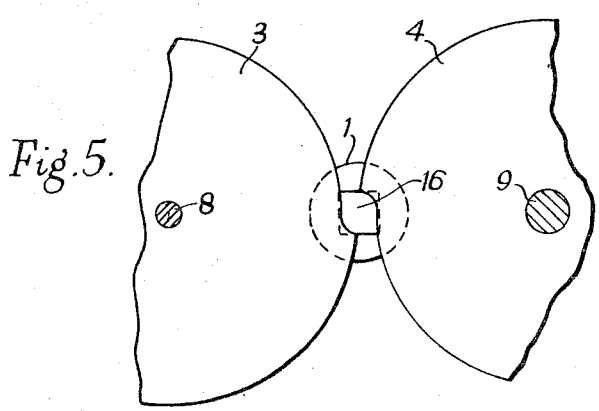

One way of carrying the invention into effect will be described with reference to the accompanying drawings in which:

FIGURE 1 is a front view of the essentials of the unit;
FIGURE 2 is a plan of FIGURE 1;
FIGURE 3 is a section of a ray source; and
FIGURES 4 and 5 are fragmentary views showing disc positions for maximum and minimum absorption.

Referring to the drawings, 1 is a casing containing a radioactive source and 2 is an ionisation chamber. The source emits rays through a window as described later with reference to FIGURE 3.

3 and 4 are metal discs of similar shape having rims which are eccentric with respect to the axes of rotation. The discs are connected by gearing comprising gear wheels 5 and 6 and an idler gear 7, the wheels 5 and 6 being fixed to the spindles 8 and 9 of the discs. 10 is a dial fixed to the spindle 9, and 11 is a hand knob by which the spindle 9 can be rotated. The dial is graduated in any convenient way and the setting of the discs can be read against a mark 12. The device shown is for use with a continuous rod cigarette-making machine, and as there is a very large range of sizes and weights to be considered with any cigarette machine, the dial is preferably marked in degrees and the setting for any particular test determined from a chart or table.

In order that the unit shall show variations as accurately as possible the bulk of the rays are absorbed by a fixed absorber as will now be described. This leaves the range provided by the discs available for covering very slight variations in absorption.

Referring to FIGURE 3, 1 is the casing having in its interior a spring 13 which presses a block 14 having a source 15 embedded therein against a thin metal window 16. This window constitutes the aforesaid fixed absorber and can be of any thickness according to the value desired.

In FIGURE 4 the discs are shown as almost completely covering the window while in FIGURE 5 the discs are so positioned that the window is almost entirely clear.

What I claim as my invention and desire to secure by Letters Patent is:

An absorber for use with a radiation gauge, said absorber comprising a pair of metal disks, a pair of shafts, each disk being mounted on one of said shafts, means supporting said shafts for rotation on spaced parallel axes with the peripheral portions of said disks in contiguous relation, the periphery of each disk being slightly eccentric to its shaft, and means for imparting concurrent rotation to said shafts to effect gradual variation in the spacing between the peripheries of said disks to adjust the absorption value thereof.

References Cited in the file of this patent

UNITED STATES PATENTS

| | | |
|---|---|---|
| 842,314 | Heeley et al. | Jan. 29, 1907 |
| 1,156,906 | Kelly | Oct. 19, 1915 |
| 2,506,342 | Burke | May 2, 1950 |
| 2,533,701 | Watt et al. | Dec. 12, 1950 |
| 2,675,486 | Green et al. | Apr. 13, 1954 |
| 2,806,147 | Stellmacher et al. | Sept. 10, 1957 |
| 2,861,189 | Bernstein | Nov. 18, 1958 |
| 2,883,555 | London | Apr. 21, 1959 |

FOREIGN PATENTS

| | | |
|---|---|---|
| 430,510 | Germany | June 19, 1926 |